(12) United States Patent
Hochstetler et al.

(10) Patent No.: US 7,550,729 B2
(45) Date of Patent: Jun. 23, 2009

(54) SCINTILLATOR-BASED DETECTORS

(75) Inventors: Eric T. Hochstetler, W. Farmington, OH (US); Diane L. Cuirle, Hudson, OH (US); Daniel J. Herr, Twinsburg, OH (US); Glenn T. Tokos, Garrettsville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 11/175,643

(22) Filed: Jul. 6, 2005

(65) Prior Publication Data

US 2007/0007460 A1    Jan. 11, 2007

(51) Int. Cl.
    *G01T 1/20* (2006.01)
(52) U.S. Cl. ...................................... 250/368
(58) Field of Classification Search .................. 250/368
    See application file for complete search history.

(56) References Cited

U.S. PATENT DOCUMENTS

| | | | | |
|---|---|---|---|---|
| 3,892,971 A | | 7/1975 | Arthur et al. | |
| 3,996,461 A | | 12/1976 | Sulzbach et al. | |
| 4,599,540 A | * | 7/1986 | Roberts | 313/570 |
| 4,676,817 A | * | 6/1987 | Tailor et al. | 65/43 |
| 5,046,854 A | * | 9/1991 | Weller et al. | 356/440 |
| 5,087,818 A | | 2/1992 | Bellian et al. | |
| 5,229,613 A | * | 7/1993 | Pandelisev et al. | 250/368 |
| 5,796,109 A | * | 8/1998 | Frederick et al. | 250/368 |
| 6,128,075 A | * | 10/2000 | Brierley | 356/244 |
| 6,359,282 B1 | | 3/2002 | Sekela | |
| 6,806,557 B2 | * | 10/2004 | Ding | 257/659 |
| 2002/0195565 A1 | | 12/2002 | Lecoq | |

FOREIGN PATENT DOCUMENTS

JP    55-065176 A    5/1980

OTHER PUBLICATIONS

Anonymous, "Gamma Camera Plate Seal," *Research Disclosure Journal*, 2 pages, publication date Aug. 1998, www.researchdisclosure.com, 41216.
Product Data, Electronic and Specialty Glass: Low Temperature Sealing, www.ferro.com, 2005, 2 pages.

* cited by examiner

*Primary Examiner*—Constantine Hannaher
(74) *Attorney, Agent, or Firm*—Larson Newman Abel & Polansky, LLP

(57) ABSTRACT

A method and apparatus for maintaining a scintillator including a window attached using a frit. The frit may be applied as a slurry, a tape or a preform. The window may be attached using an eyelet. A method and apparatus for maintaining a scintillator including a window attached by a braze.

30 Claims, 5 Drawing Sheets

SCINTILLATOR-BASED DETECTORS

BACKGROUND OF THE INVENTION

1. Field of Invention

The present invention is directed to radiation detectors and, more particularly, to methods and apparatus for maintaining scintillator-based detectors.

2. Discussion of Related Art

Typically, in scintillator-based detector apparatus, radiation that is not easily detected by conventional photodetectors (e.g., a photodiode or a CCD) is projected onto a scintillator. The scintillator absorbs the radiation and, in response, emits scintillation light in a wavelength band that is more readily detected by a conventional photodetector. For example, scintillators utilized in detector apparatus to detect high-energy radiation (e.g., x-rays, gamma rays, alpha particles, beta particles) absorb the radiation and emit infrared light or visible light in response to the type and/or intensity of the radiation.

Scintillator-based detector apparatus are utilized in many fields. For example, such detector apparatus are conventionally used in geophysical applications (e.g., mining and oil well logging) as well as in radio gauging (RG) and computer tomography (CT) applications.

In some detector apparatus, scintillation light, emitted by the scintillator in response to the absorb radiation energy, is directed to a photodetector, which generates an electric signal indicative of the incident radiation. In some embodiments of scintillator-based detector apparatus, it is desirable to maintain the scintillator in a housing that protects the scintillator from adverse environmental conditions, moisture, or chemical agents to which the detector apparatus may be exposed during use. FIG. 1A is a schematic illustration of a conventional scintillator-based detector apparatus 100. In detector apparatus 100, a scintillator 110 is maintained in a housing 120 having a glass window 130 through which scintillation light from scintillator 110 is projected to a photodetector assembly 140.

SUMMARY OF THE INVENTION

Aspects of the present invention are directed to components and assembly thereof in scintillator-based detector apparatus. According to some aspects of the invention, a window is secured to a portion of a housing assembly using a frit material or frit. In some embodiments of the invention, the use of the frit provides the ability of a scintillator-based detector apparatus to operate in environmental conditions that are more adverse than those in which conventional scintillator-based detector apparatus may reliably operate.

For example, an aspect of the invention pertinent to one or more embodiments thereof is directed to an apparatus for use with a scintillator capable of producing scintillation light in response to radiation. The apparatus can comprise a housing including a first housing component configured to receive the scintillator and a window coupled to the housing by a frit. The window is typically configured and arranged to transmit at least a portion of the scintillation light.

In accordance with one or more embodiments, the invention provides a method of manufacturing a detector. The method can comprise acts of providing a housing component constituting a portion of a housing, providing a window, and applying a frit between the housing component and the window. The method can further comprise an act of locating a scintillator in the housing component.

In accordance with one or more embodiments, the invention provides a detector for radiation comprising a scintillator and a photodetector disposed in a housing assembly; a window disposed in the housing assembly; and optically coupling the scintillator and the photodetector. The window is typically secured in the housing assembly by a braze.

In accordance with one or more embodiments, the invention provides a method of manufacturing a detector. The method can comprise acts of providing a housing component constituting a portion of a housing; providing a window; brazing the window to the housing component; and locating a scintillator in the housing component.

In accordance with one or more embodiments, the invention provides an apparatus comprising a housing and a window coupled to the housing by a braze. The housing can include a first housing component configured to receive a scintillator. The window is configured and arranged to transmit at least a portion of scintillation light from the scintillator.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The term "radiation" is defined herein to include electromagnetic radiation and high-energy particles (e.g., gamma radiation, alpha particles and beta particles). The term "light" is defined herein to include electromagnetic radiation of any wavelength, and is not limited to visible light. The term "scintillator" is defined herein as a material that emits light in response to excitatory radiation incident thereon.

For convenience, herein below, the term "excitatory radiation" (or simply radiation) is used to refer to electromagnetic radiation or particles that impinge on a scintillator or are absorbed by a scintillator. The term "scintillation light" (or "emitted light") is used to refer to electromagnetic radiation that is outputted or emitted from and/or generated by the scintillator in response to the excitatory radiation. The use of the term "radiation" to refer, to that which impinges or is incident on a scintillator, and the use of the term "light" to refer to that which is output from a scintillator is merely for clarity of description. No further limitation should be read into the use of these terms in such a manner, beyond that which is presented by the definitions above. It is to be appreciated that according to these definitions there is considerable overlap in the wavelengths that may be described as radiation and light. With respect to radiation, emission is the generation and sending out of radiant energy. The emission of radiation energy is considered separately from the process of transmission which is the passage of radiant energy (light) through a medium.

Figure 1A:
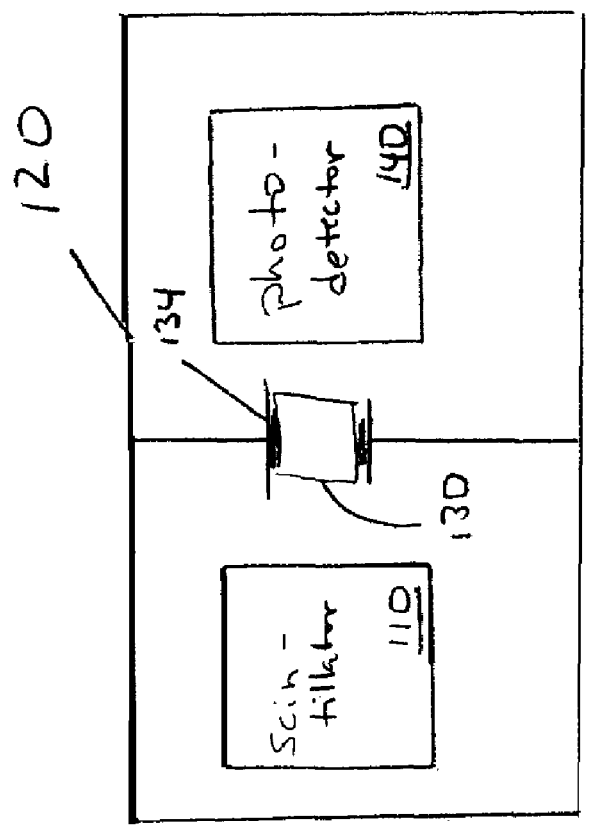
FIG. 1A is a schematic illustration of a conventional scintillator-based detector apparatus.

In a conventional scintillator-based detector apparatus, such as apparatus 100 shown in FIG. 1A, a window 130 through which scintillation light is projected from a scintillator 110 to a photodetector assembly 140 is connected or secured to a housing assembly 120 by a mounting apparatus or assembly 134. For example, as shown in FIG. 1B, mounting apparatus 134 may comprise an eyelet 135 adjacent to a metalized side 131 of window 130. In such apparatus, side 131 of window 130 is connected to eyelet 135 by a solder. The eyelet may then be connected to a portion of housing sub-assembly 120a using any suitable technique. For example, the eyelet may be welded to the housing assembly.

Figure 1C:
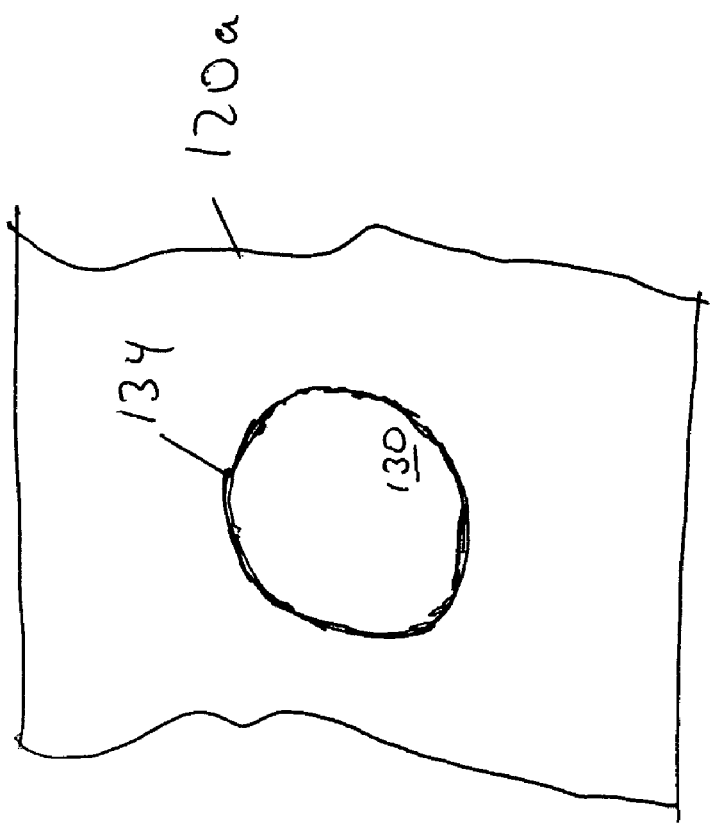
FIG. 1C is a schematic illustration of a conventional mounting apparatus comprising a window having a metalized side.
Figure 1B:
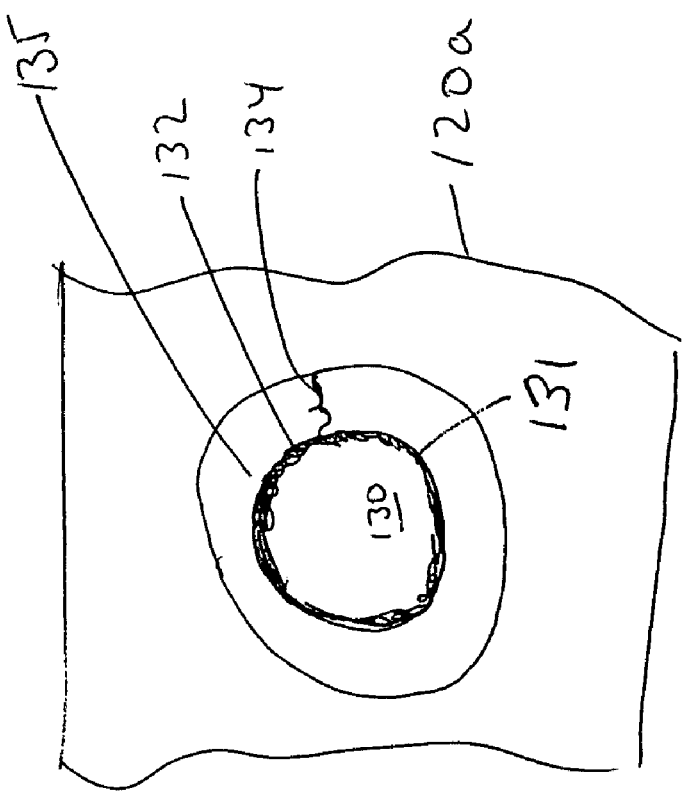
FIG. 1B is a schematic illustration of a conventional mounting apparatus comprising an eyelet and a window melted and solidified such that the glass adheres to a portion of housing.

Alternatively, as shown in FIG. 1C, the glass comprising window 130 may be melted and solidified such that the glass adheres to a portion of housing sub-assembly 120a to form a mechanical joint. In such configurations, mounting apparatus 134 comprises a portion of the glass that adheres to portion of housing sub-assembly 120a.

Aspects of the present invention overcome drawbacks of conventional scintillator-based apparatus. One drawback of apparatus employing a solder is that solder joints typically have relatively low melting points. Accordingly, detector apparatus having components thereof coupled by a solder have relatively limited operating conditions. Such limitations can become a hindrance to operations relying on such detectors. For example, where solder-secured components of scintillation-based detectors are used in geophysical applications, the detector may be operated in proximity to a drill that bores through rock formations thereby exposing such apparatus to extreme environmental conditions. The operation of the drilling system may need to be moderated to avoid generating temperatures that adversely affect the integrity of the solder based assembly. For example, to avoid the generation of excessive heat, the drilling system may be required to have idle periods to avoid excessive temperatures. Alternatively, the drilling system may be operated at a reduced speed to avoid excessive temperatures. Any such reduction of capacity in drilling operations results in an increase in the time and cost of completing a given geophysical task.

In embodiments of detectors manufactured to secure a window by melting the window, the compositions of the glass and the eyelet impact the joint that is formed between the window and the housing. One drawback of connections including a melted window is that the chemical composition of the glass and/or metal from a particular supplier may vary, thus resulting in inconsistent or unreliable detectors because of low quality joints. Further, fabrication by melting requires higher processing temperatures which significantly increase fabrication costs.

Aspects of the invention are directed to a joint that provides or serves as a coupling between a ceramic or glass component, such as a window, and a metal component, such as a housing assembly. Some aspects of the invention pertain to hermetic seals isolating a chamber or space of another chamber in apparatus that utilizes glass or ceramic components as well as metal components, such as scintillator-based detectors.

A glass frit may be utilized to secure the glass or ceramic components in place and further serve to facilitate establishing a hermetic sealed chamber. For example, the glass component can define a chamber in an apparatus and the joint securing the glass component can facilitate hermetically sealing the chamber. Coupling a window using a frit advantageously avoids one or more drawbacks associated with conventional scintillator-based detection apparatus. Thus in accordance with one or more embodiments of the invention, a frit may provide a more reliable joint for securing a window to housing structures of scintillator-based detector apparatus.

In accordance with one or more particular aspects of the invention, a window may be secured to the housing assembly of scintillator-based detector apparatus by relying on brazes as a bridge between the window and the housing assembly. Brazing techniques may also advantageously facilitate hermetically sealing a chamber of the apparatus. The use of brazing assembly techniques may also improve the overall performance reliability of apparatus exposed to extreme conditions by providing a seal or joint that is thermomechanically more stable than conventional solder-based apparatus.

Figure 2A:
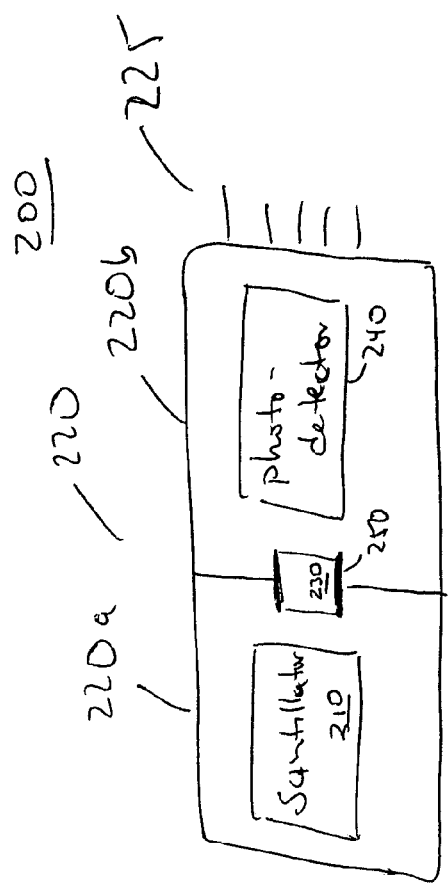
FIG. 2A is a schematic illustration of an exemplary embodiment of a scintillator-based detector apparatus in accordance with one or more aspects of the present invention.

FIG. 2A is a schematic illustration of an exemplary embodiment of a scintillator-based detector apparatus 200 relating to one or more aspects of one or more embodiments of the invention. In detector apparatus 200, a scintillator 210 is maintained in a housing assembly 220 having a window 230 coupled to housing assembly 220 using a seal fabricated from a frit material 250.

Housing assembly 220 is typically adapted to contain scintillator 210. In some embodiments of the invention, housing assembly 220 comprises a first component 220a and a second component 220b. For example, first housing component 220a may be adapted to enclose one or more scintillators, and second housing component 220b may be adapted to enclose one or more photodetector assemblies 240. First housing component 220a and second housing component 220b are typically adapted to be coupled together, and may be coupled using any suitable technique. In some embodiments, a first housing component maintains both the scintillator and the photodetector. A suitable electrical connector 225 may be utilized to provide input and/or output signals to and/or from photodetector assembly 240 to/from one or more monitoring and/or recording stations (not shown).

Housing assembly 220 may comprise any suitable material. Housing assembly 220 should at least partially transmit radiation to be detected by detector apparatus 200, such that the radiation can impinge on scintillator 210. Housing assembly 220 is also typically configured such that light emitted by the scintillator impinges on photodetector assembly 240.

In some embodiments of the invention, at least second housing component 220b may be opaque to light to be detected by photodetector assembly 246. Such configurations can prevent light, other than scintillation light from scintillator 210, from being undesirably detected by photodetector assembly 240. In some embodiments of the invention, second housing component 220b may comprise a material or be constructed to provide shielding against electromagnetic energy, such as undesirable electromagnetic noise, that may be introduced onto signals generated by the photodetector. Thus, for example, housing assembly 220 may be comprised of a metallic or ceramic material or other similar material that is electromagnetically insulative. Exemplary housing materials include, but are not limited to, stainless steel, titanium, aluminum, alumina and alloys or composites thereof.

In some cases, window 230 is connected or otherwise secured to first housing component 220a by joint 250. Joint 250 can be, for example, fabricated utilizing a frit material. Such an arrangement may provide advantages in maintaining or securing scintillator 210 because the frit-based component may facilitate hermetically sealing the window and the housing assembly as well as, in some cases, accommodating hermetically sealing the scintillator within housing component 220a.

Frit 250 may be made of any suitable material capable of maintaining window 230 and housing assembly 220 suitably coupled together when the frit is cured. In some embodiments, it is preferable that frit 250 provide suitable resistance to shock and heat. Typically, frit 250 has similar coefficients of thermal expansion (i.e., the frit is thermally matched) to one or both of the window 230 and housing component 220a. In some embodiments, it is preferable that the difference in thermal coefficients between the frit and the window and/or the frit and housing component 220a is less than about $+/-5\times 10^{-7}/°$ C., typically throughout the desired or operating temperature of the scintillator-based detector apparatus. Frit-based materials, however, typically have a coefficient to thermal expansion that differs from the coefficient of thermal expansion of the materials typically comprising the housing assembly. For example, housing assemblies are typically comprised of a metal or metal alloy whereas frit-based materials have thermal expansion coefficients that are similar to glasses. Thus, the present invention is not to be limited to a difference in thermal expansion and a compression fit between the housing and window may be operationally acceptable especially when a larger difference in thermal coefficients may exist.

Frit 250 may be comprised of and/or fabricated from vitreous or devitrifying frit materials. A vitreous frit material is thermoplastic and melts and flows each time the frit is exposed to any temperature greater than a predetermined, curing temperature. By contrast, a devitrifying frit is thermosetting. A temperature that is substantially greater than the curing temperature is typically required to re-melt a devitrifying frit material after it has been cured. Frit 250 may be selected according to one or more of the following criteria: the composition of the frit material, the coefficient of thermal expansion of the resultant component, the melting temperature of the frit material, the particle size of the frit material and any other characteristics of the frit material. Other considerations may include the composition or material of construction of the window and/or the housing assembly or portion thereof. It is to be appreciated that the particle size of the frit starting material, e.g., the green frit material, including the maximum size and the average size of the particles may be chosen to achieve a selected flowability and wetting ability when the green frit material is applied to the window and/or the housing surfaces. Table 1 includes a list of exemplary frit material and also indicates whether the frits are vitreous (V) or devitrifying (D).

Referring to the figures, window 230 is disposed in a location to permit light emitted by scintillator 210, scintillation light, to reach photodetector assembly 240. Window 230 may be comprised of any suitable material that is at least partially transparent to scintillation light emitted by scintillator 210 to permit direction to photodetector assembly 240. For example, window 230 may comprise at least one material selected from the group consisting of soda lime and sapphire. The dimensions of scintillator 210, window 230 and housing assembly 220 may assume conventional dimensions and configuration that achieve a desired sensitivity or response. Typically, the dimensions can be selected such that an adequate portion or at least a threshold amount of the light emitted by the scintillator reaches the photodetector.

TABLE 1

| Frit Materials | Character: Vitreous (V) or Devitrifying (D) |
| --- | --- |
| Potash Soda Lead | V |
| Aluminosilicate | V |
| Alkali Borosilicate | V |
| Lithia Potash Borosilicate | V |
| Lead Zinc Borosilicate | D |
| Zinc Borosilicate | D |
| Zinc Boric Lead | D |
| Lead Barium Borosilicate | D |
| Alkali Barium | V |
| Alumina Loaded Alkali Borosilicate | V |
| Alumina Loaded Alkali Barium Borosilicate | V |

Figure 2C:
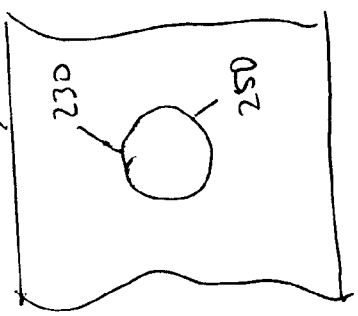
FIG. 2C is a schematic illustration of an exemplary embodiment of a mounting apparatus, in accordance with one or more aspects of the present invention, in which a window is connected directly to a housing component.
Figure 2B:
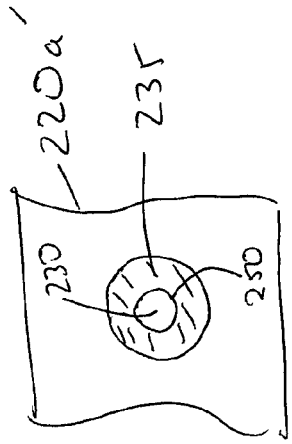
FIG. 2B is a schematic illustration of an exemplary embodiment of a mounting apparatus, in accordance with one or more aspects of the present invention, in which a window is coupled to a housing component by an eyelet.

FIGS. 2B and 2C are exemplary schematic illustrations showing window 230 coupled to housing components 220a' and 220a", respectively, in accordance with one or more embodiments of the invention. In FIG. 2B, window 230 is coupled or secured to housing component 220a' by an eyelet 235. In such an arrangement, lo window 230 is connected to eyelet 235 by joint 250. In FIG. 2C, window 230 is connected or secured to housing component 220a" using a seal 250, which is disposed directly on the housing without the use of an eyelet. In the embodiments illustrated in FIGS. 2B and 2C, seal 250 may be disposed directly on a surface of the window or any suitable material disposed intermediate the frit-based material and the 15 window to maintain the window in place. In an apparatus configured as illustrated in FIG. 2B, any suitable technique may be used to connect or secure eyelet 235 to the housing, including the use of a second seal, e.g., a second frit or even welding to the housing.

Figure 3A:
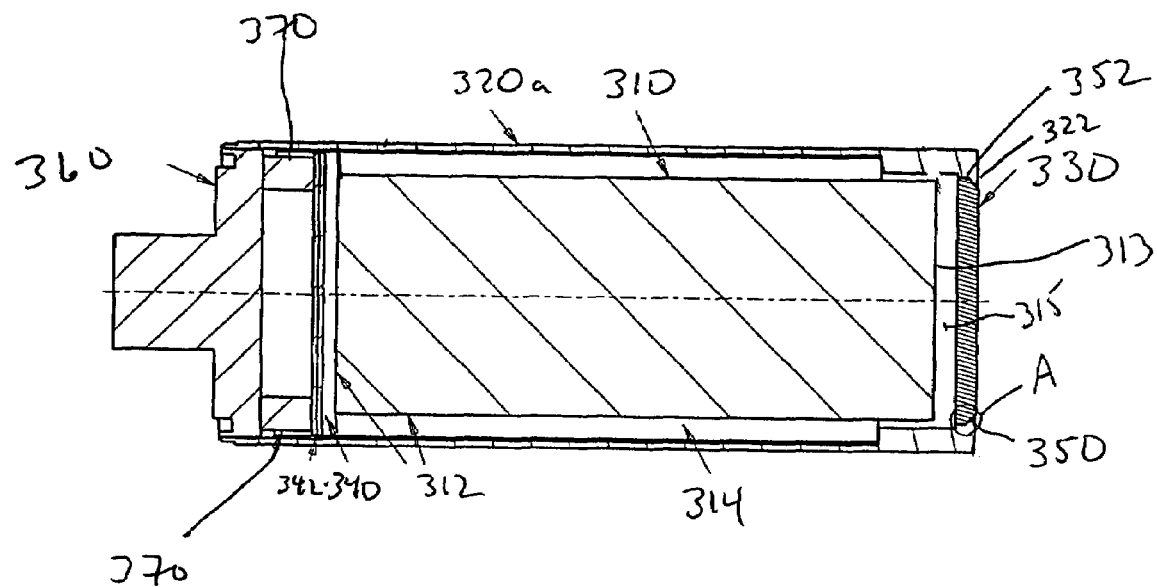
FIG. 3A is a schematic illustration showing details of a detector apparatus exemplarily illustrated in FIG. 2A.

FIG. 3A is a schematic illustration of further details of a detector apparatus 20 showing further aspects of the present invention. For illustrative purposes, the exemplary embodiment illustrated in FIG. 3A includes a window 330 connected to, secured to, or maintained in a housing assembly without the use of an eyelet. However, it is to be appreciated that window 330 may be connected to the housing assembly as discussed above with reference to the embodiments illustrated in FIG. 2B.

Housing component 320a of the exemplary apparatus illustrated in FIG. 3A may have any suitable cross-sectional geometry (e.g., circular, oval, polygonal, square or rectangular). In some embodiments, housing component 320a has a tapered end 322 sized and shaped to maintain window 330 therein. Correspondingly, window 330 can have a shape complementary to tapered end 322. When window 330 is positioned in the housing component, a joint 352 is typically defined or formed between the housing component and the window.

Figure 3B:
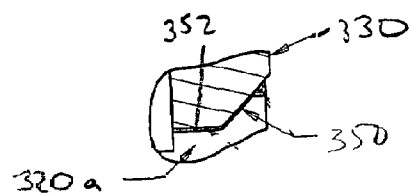
FIG. 3B is an expanded view of Facet A of FIG. 3A.

In the portion of a detector apparatus illustrated in FIG. 3A, window 330 is coupled to a housing component 320a using a seal 350. Seal 350 can be comprised from a frit material and can be disposed in an area or region between window 330 and housing component 320a. The frit material may be disposed between window 330 and housing component 320a prior to assembly of the window and the housing component. The frit material is typically applied to joint 352 formed between the window and the housing when the window and housing are in a joined arrangement. Facet A of FIG. 3 is illustrated in greater detail in FIG. 3B. In FIG. 3B, it is illustrated that window 330 is coupled to housing 320a by seal 350 which is disposed in joint 352.

The slurry may be formed by suspending frit material in a carrier, which is typically a solvent. The carrier can be any suitable solvent that is readily removed, if desired, after deposition thereof. For example, the carrier can be a volatile solvent such as, but not limited to, amyl acetate or denatured alcohol, which can be removed by evaporative techniques. Other ingredients may comprise the frit material. For example, a binder may be included in the frit slurry to improve suspension characteristics and increase green strength thereof.

The frit slurry may be applied using any suitable technique including, for example, brushing, spraying, screening, electrophoreses, and spin coating. For example, seal 350 may be fabricated by applying a frit material slurry or mixture to the surfaces at or near the region between the window and the housing component. In accordance with one or more particular embodiments, application of the frit slurry may be performed by utilizing a paint brush (e.g., a horse hair paint brush). Typically, the formation of bubbles is avoided during application of the slurry. After the joint is suitably filled with frit slurry, the slurry may be cured. In some embodiments of the invention, the frit may shrink upon curing. In such embodiments, a second coating of frit slurry may be applied and a second step of curing may be performed. Additional applications of slurry and curing steps may be performed as desired or as necessary to fabricate the seal.

After application of the slurry, the solvent can be removed by, for example, drying and the binder can be removed by, for example, burning out. Solvent drying and binder burnout may be performed simultaneously, in one step, or during different or successive steps. Furthermore, drying, binder burnout, or both may occur during the setting step of the frit. Drying and/or burnout may be performed at any suitable temperature and/or under any suitable atmosphere. Typically, drying is performed at a temperature and/or at a pressure that facilitates solvent evaporation. In some cases, drying can be performed under a vacuum or with an inert purging gas carrier.

In some embodiments, rather than applying the frit material as a liquid or slurry, the frit material may be applied as a frit tape, as a portion of a semi-solid strip of material. In such embodiments, exemplary vehicles for applying the frit material may include any one or more combinations of amyl acetate and a nitrocellulose binder. The tape may be formed by, for example, extruding the frit material with one or more solvents, and/or binders. For example, small amounts of green frit material may be extruded.

In other embodiments, a frit may be applied as a frit preform. For example, a semi-solid portion of a frit material can have a predetermined shape, preferably selected to correspond with or match the shape of the joint defined between the window and the housing assembly. In further embodiments, a window may be coupled to an eyelet using a frit tape or pre-form. The eyelet may, in turn, be coupled to housing component 220a as discussed above.

In accordance with further embodiments of the invention, the window can be secured to the housing assembly and/or to an eyelet by utilizing brazing techniques. The brazing material, typically a brazing alloy, can be selected to provide any desired characteristic or performance. For example, the brazing material can be selected to sufficiently secure the window to the housing assembly at an exposure temperature of at least about 450° C. The resultant braze can further facilitate hermetically sealing at least one chamber within the detector apparatus.

Brazing provides advantages over conventional techniques because it facilitates the operation of systems and/or assemblies at higher temperatures. Notably, the utilization of brazing techniques can reduce the magnitude of any discontinuity between differing materials with respect to their coefficients of thermal expansion. Indeed, even if conventional fabrication procedures provide less expensive assemblies, the utilization of brazing techniques improves reliability of assembled systems because any stresses associated with thermal cycling can be mitigated by brazing. Likewise, the utilization of frit materials to fabricate seals that secure components can also provide similar advantages.

Non-limiting examples of brazing materials include those commercially available from WESGO® Metals, Hayward, Calif. For example, the window comprising sapphire can be brazed to a housing assembly comprising titanium by utilizing TICUSIL® brazing alloy or CUSIL® alloy.

Brazing can be performed by utilizing any suitable brazing technique. For example, brazing can involve activating by heating the brazing alloy to facilitate wetting the surfaces of the substrates to be joined with the brazing alloy. In some cases, brazing can be performed under an inert atmosphere and/or under an atmosphere that prevents oxidation of the substrates or the brazing alloy. For example, brazing can be performed under a vacuum or under a purging nitrogen blanket. Where appropriate, releasing or masking agents may be utilized to prevent or protect against brazing alloy exposure. Non-limiting examples of masking agents include lacquers such as those commercially available as NICOBRAZ® STOP-OFF™ from Wall Colmonoy Corporation, Madison Heights, Mich. Likewise, other brazing aids may be utilized including, for example, fluxes, cements, and/or fillers.

Where desirable, masking agents may be applied on, for example, the polished surfaces of the window to prevent brazing material migration thereon. The window may then be seated onto the housing utilizing one or more fixtures. In accordance with some aspects of the invention, the fixtures or components thereof may be made from high temperature machinable glass-mica materials. The brazing material, e.g., TICUSIL® brazing alloy, as wire form, can be formed into the, for example, ring-shaped segment that can seat in the joint area. Other forms of the brazing material, such as foil, paste and/or powder can be also utilized.

The assembly can then be heated to initiate brazing. Examples of suitable heating techniques include, for example, those that utilize induction heating principles. Heating can be performed under a vacuum atmosphere or under an inert gas purging atmosphere. Examples of induction heating systems include those commercially available from, for example, Induction Atmospheres, LLC, Rochester, N.Y. Heating can also be performed in a furnace or oven having vacuum or inert gas purging capabilities that can prevent or inhibit oxidation while processing. Any suitable vacuum level may be utilized but, in accordance with some aspects of the invention, vacuum atmospheres during brazing typically are about the $10^{-5}$ atmospheres. Where inert gas is used, purging may similarly be performed to maintain or inhibit oxidation of the components. For example, purging may be performed with argon or nitrogen or any other inert gas with a volume equal to about ten times the volume of the vessel at a rate of 30 cubic feet per minute. Purging is performed until the process is performed. At the appropriate brazing temperature, a heat soak may optionally be maintained to insure or promote thorough wetting of surfaces to be joined. For example, heating may be performed for a period about 15 minutes including a dwell temperature or soaking temperature that can last from about 10 minutes to about 15 minutes. Typically, the heat soak temperature is any suitable temperature that promotes melting and/or activation of the active brazed component of the brazing material. For example, heating can be performed to achieve a heat soaking temperature of about 900° C.

Thereafter, the assembly can be allowed to cool to room temperature. Cooling can be optionally performed at a controlled rate. The cooled assembly may then be cleaned off with water to remove any masking agents. Visual inspection as well as other tests directed at ensuring the quality of the assembled system may also be performed.

As noted, the surfaces of the window and the housing assembly are typically cleaned prior to assembly thereof into the detector apparatus. Conventional cleaning techniques can be used to prepare the surfaces and avoid and/or remove contaminants. For example, cleaning can be performed by utilizing a detergent and/or a solvent. Examples of such suitable cleaning agents include, but are not limited to, organic and aqueous solutions such as isopropyl alcohol. Typically, lint-free materials are also utilized during the surface preparation process to prevent or reduce the likelihood of the presence undesirable substances on the wetted surfaces. Other surface preparation techniques such as, but not limited to, acid etching and/or ultrasonic dipping can also be utilized. Where suitable, cleaning equipment such as washing machines, ultrasonic cleaners, pickling equipment, and other various cleaning systems, can be utilized in the techniques of the invention. Subsequent to cleaning, the cleaned components may be dried before assembly.

Referring again to FIG. 3A, a reflector 312 may be disposed in housing component 320a to reflect light emitted by the scintillator back into the scintillator. The reflector may be disposed at one or more surfaces of the scintillator, except for at least a portion of a surface of the scintillator (e.g., surface 313) that faces a photodetector assembly. Reflector 312 may be comprised of any suitable reflective material. In some embodiments, reflector 312 comprises a material that is white and opaque. For example, a white TEFLON® polytetrafluoroethylene tape may serve as a reflector and be disposed on one or more surfaces of the scintillator. It is to be appreciated that reflector 312 may be specularly reflective or diffusely reflective, entirely or portions thereof.

A shock absorber 314 may be disposed inside the housing to protect the scintillator from shock that may be encountered during use. The shock absorbing material should be suitably transparent to radiation that is to be detected or monitored. The shock absorber may be wrapped around the scintillator.

In the illustrated embodiment, scintillator 310 is maintained firmly in place by selecting suitable dimensions for housing component 320a, scintillator 310, and shock absorber 314. Additionally, a cushioning material 315 may be located along the surface of the scintillator facing a photodetector assembly (shown in FIG. 2A). The cushioning material should be at least partially transparent to light emitted by the scintillator, so that at least a portion of the light emitted by the scintillator reaches the photodetector. The cushioning material may be comprised of any suitable material. For example, the cushioning material may comprise at least one of a rubber, a silicone, a grease or even a suitable gas.

Any suitable gas may also be present in the detector apparatus to maintain the scintillator in gas. Alternatively, gas may be evacuated from the apparatus to form at least a partial vacuum. An end cap 360 may be secured to the apparatus using any suitable technique so enclose the scintillator. For example, the end cap may be welded to form a part of housing component 320a and to maintain any gas in the detector apparatus, or to maintain a vacuum, in the detector apparatus. In some embodiments of the invention, the window is hermetically sealed to the housing by frit 350 and cap 360 is also hermetically sealed to the housing such that the scintillator is hermetically contained within the apparatus. In either embodiment of the invention, springs 370 or other elastic materials may be disposed between the end plate and the reflective surface 342 or scintillator to firmly maintain the scintillator 310 in place and/or provide resistance to shock or vibration.

Figure 4A:
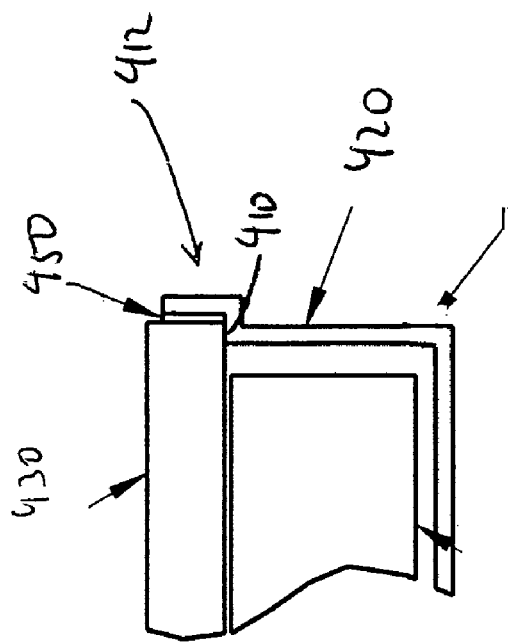
FIGS. 4A and 4B illustrate exemplary embodiments of windows coupled to a housing according to one or more embodiments of the present invention.
Figure 4B:
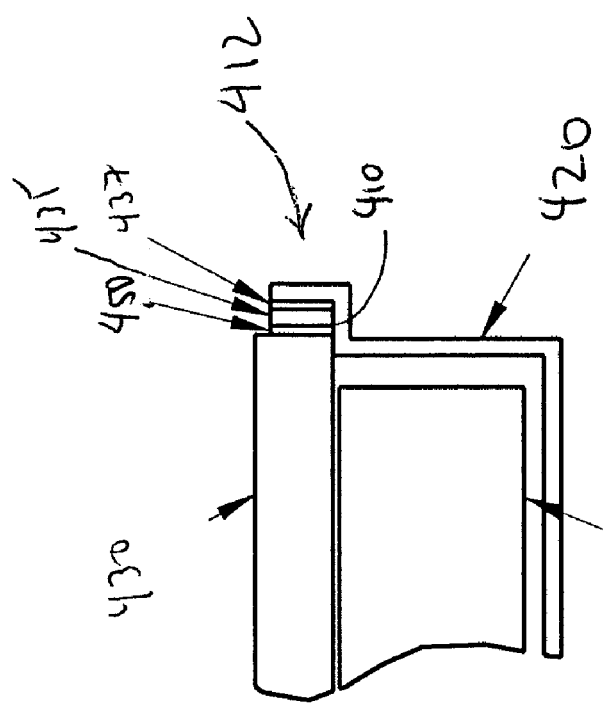

FIGS. 4A and 4B exemplarily illustrate an embodiment of the invention wherein a portion 410 of a scintillator apparatus can be mounted within a housing assembly 420, having a flared end 412 that can facilitate coupling of window 430 to the housing assembly using a seal 450. In each of FIGS. 4A and 4B, window 430 is mounted against a shelf structure 410 of housing assembly 420. In FIG.4A, shelf 410 facilitates coupling of the window to the housing by providing a resting surface during application of seal 450. As shown in FIG. 4B, shelf 410 can facilitate coupling of the window to the housing assembly. Slurry 450 may be applied to window 430 and/or eyelet 435 and cured, prior to placing the window on the shelf of the flared end. The window and eyelet may be positioned in the flared end and a suitable solder joint 437 (or weld) may be formed between the eyelet and housing assembly.

EXAMPLE

As exemplarily shown in the schematic diagrams presented in FIGS. 4A and 4B, a window can be secured to a housing assembly or component thereof. The window can comprise any type of glass such as, but not limited to, soda-lime, crown glass, sapphire, quartz, etc. It can have optical surfaces that are smooth and free of defect to a degree suitable for optical transmission purposes. The sides of the glass window that will be involved in the seal area can be left diffuse and as fabricated because, in some cases, a rougher texture can augment adhesion and/or wetting by the joining material. The surfaces of the glass window are preferably cleaned with de-ionized water, acetone and lint free wipes prior to assembly. Typically, the sides of the window can be pre-coated with a fritable or brazeable material used to join the components.

The frame or housing component can be formed from any suitable metal or material. The housing component material can comprise an alloy that is selected to, in some cases, have a coefficient of thermal expansion that is about the same as the coefficient of thermal expansion as the material of the window. For example, one or more housing components can comprise KOVAR® alloy, available from Carpenter Technology Corporation, Reading, Pa., but can be any suitable metal such as stainless steel (e.g. grade 304, 316, or 430) or titanium (e.g. grade Ti-6A1-4V), or aluminum (e.g. grade 6061)). The housing components can be fabricated with the features as depicted in FIGS. 4A and 4B, described above and such that a clearance distance of about 0.005-inch can separate the parts. The surfaces of the housing component can be cleaned with acetone and lint free wipes. The sides of the frame can then be pre-coated with the fritable or brazeable material to form the joint.

If a frit is utilized, preparation and application typically depends on the form being utilized. For example, if glass powder is utilized, the material can be mixed with a suitable binder material to keep it in the joint area. If a paste form is utilized, it can be applied directly to the joining components. If a tape or other similar form is utilized, it can be prepared as a pre-form that can conform into the joint area.

If the parts are to be joined by a braze, the brazing material can be formed or shaped to fit the joint from wire or foil forms. Paste or powder form of brazing materials can be likewise applied to form the joint.

The joint-forming material can then be formed by heating the assembly to a temperature at which the joint-forming material will melt and flow into the joint region and wet to the parts. The assembly can then be allowed to cool at an appropriate rate so that the material solidifies in the joint and the component parts do not fracture due to thermal shock.

Once cooled and solidified, the assembly can be inspected for leakage. This can be performed visually or according to one or more particular or suitable testing procedures. For example, the joint integrity can be evaluated by determining whether a vacuum condition can be maintained.

In fabricating the joint illustrated in FIG. 4B, the fabrication process would be the same except that the joint opening is left wider and some transition material would typically be used to fill the volume between the pieces. A pre-formed frit or braze material can be utilized. The pre-form could then be melted and no additional joining material may need to be utilized.

If the transitional material serves to fill the gap and is not intended to be melted at the processing temperature, the joining material would adhere to the transition and the surfaces of the two joined components.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The terms "including," "comprising," or "having," "containing," "involving," and variations thereof herein, are open-ended and encompass the items listed thereafter, and equivalents thereof, as well as additional, typically optional, items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for use with a scintillator capable of producing scintillation light in response to a radiation, comprising:
    a housing including a first portion configured to receive the scintillator; and
    a window coupled to the housing by a composition formed from a glass frit, the window being configured and arranged to transmit at least a portion of the scintillation light, wherein the composition is disposed directly on the housing without use of an eyelet.

2. The apparatus of claim 1, wherein the composition is disposed on a surface of the window.

3. The apparatus of claim 2, wherein the frit is disposed on a surface of the first portion, whereby the window and the first portion are connected together by the frit.

4. The apparatus of claim 1, wherein the window is configured and arranged to transmit scintillation light to a photodetector.

5. The apparatus of claim 4, wherein the housing further comprises a second portion enclosing the photodetector and coupled to the first portion.

6. The apparatus of claim 1, wherein the housing comprises steel, titanium, aluminum, an alloy or a composite thereof.

7. The apparatus of claim 1, wherein the composition forms a hermetic seal between the window and the housing.

8. The apparatus of claim 7, wherein the first portion and the window are adapted to hermetically seal the scintillator.

9. The apparatus of claim 8, wherein the composition is disposed on a surface of the window.

10. The apparatus of claim 1, wherein the glass frit is a vitreous frit material or a devitrifying frit material.

11. The apparatus of claim 1, wherein the glass frit includes potash soda lead, aluminosilicate, alkali borosilicate, lithia potash borosilicate, alumina loaded alkali borosilicate, alumina loaded alkali barium borosilicate, or any combination thereof.

12. The apparatus of claim 1, wherein the glass frit includes lead zinc borosilicate, zinc borosilicate, lithia potash borosilicate, or any combination thereof.

13. The apparatus of claim 1, further comprising:
    a scintillator disposed in the first portion;
    a reflector surrounding the scintillator; and
    a shock absorber lying between the reflector and the housing.

14. A method of manufacturing a radiation detector, comprising:
    providing a housing component constituting a portion of a housing of the radiation detector;
    providing a window;
    applying a glass frit between the housing component and the window, wherein the glass frit is applied to a surface of the housing component, and the surface consists essentially of a metal or a metal alloy; and
    locating a scintillator in the housing component.

15. The method of claim 14, wherein the step of applying the glass frit comprises applying a glass frit slurry.

16. The method of claim 14, wherein the step of applying the glass frit comprises applying a glass frit tape.

17. The method of claim 14, wherein the step of applying the glass frit comprises applying a glass frit preform.

18. The method of claim 14, wherein the step of applying the glass frit comprises applying the glass frit directly on a surface of the window.

19. The method of claim 14, further comprising a step of curing the glass frit.

20. The method of claim 19, wherein the step of curing the glass frit comprises forming a hermetic seal between the window and the housing component.

21. The method of claim 14, wherein the glass frit is a vitreous frit material or a devitrifying frit material.

22. The method of claim 14, wherein the glass frit includes potash soda lead, aluminosilicate, alkali borosilicate, lithia potash borosilicate, alumina loaded alkali borosilicate, alumina loaded alkali barium borosilicate, or any combination thereof.

23. The method of claim 14, wherein the glass frit includes lead zinc borosilicate, zinc borosilicate, lithia potash borosilicate, or any combination thereof.

24. The method of claim 14, wherein the housing component comprises a metallic material.

25. A radiation detector comprising:
    a scintillator and a photodetector disposed in a housing assembly, wherein the housing assembly consists essentially of a metal or a metal alloy; and
    a window disposed in the housing assembly and optically coupling the scintillator and the photodetector, wherein the window comprises sapphire;

wherein the window is secured in the housing assembly by a composition formed from a glass frit.

26. The radiation detector of claim 25, wherein the composition hermetically seals a chamber of the radiation detector.

27. The radiation detector of claim 25, wherein the glass frit is a vitreous frit material or a devitrifying frit material.

28. The radiation detector of claim 25, wherein the glass frit includes potash soda lead, aluminosilicate, alkali borosilicate, lithia potash borosilicate, alumina loaded alkali borosilicate, alumina loaded alkali barium borosilicate, or any combination thereof.

29. The radiation detector of claim 25, wherein the glass frit includes lead zinc borosilicate, zinc borosilicate, lithia potash borosilicate, or any combination thereof.

30. The radiation detector of claim 25, further comprising:
a reflector surrounding the scintillator; and
a shock absorber lying between the reflector and the housing.

* * * * *